US012098082B2

(12) United States Patent  
Smith et al.

(10) Patent No.: US 12,098,082 B2  
(45) Date of Patent: Sep. 24, 2024

(54) MOBILE FILTRATION TECHNOLOGY

(71) Applicant: Advanced Mobile Filtration Services International, LLC, Fort Worth, TX (US)

(72) Inventors: Timothy Smith, Fort Worth, TX (US); Michael Atkinson, Fort Worth, TX (US); Gerard Simon, Fort Worth, TX (US)

( * ) Notice: Subject to any disclaimer, the term of this patent is extended or adjusted under 35 U.S.C. 154(b) by 476 days.

(21) Appl. No.: 17/468,497

(22) Filed: Sep. 7, 2021

(65) Prior Publication Data

US 2022/0073368 A1 Mar. 10, 2022

Related U.S. Application Data

(60) Provisional application No. 63/074,625, filed on Sep. 4, 2020.

(51) Int. Cl.
  *B01D 33/03* (2006.01)
  *B01D 63/16* (2006.01)
  (Continued)

(52) U.S. Cl.
  CPC .............. *C02F 1/004* (2013.01); *B01D 33/03* (2013.01); *B01D 63/16* (2013.01); *B60P 1/5423* (2013.01);
  (Continued)

(58) Field of Classification Search
  CPC .......... C02F 1/004; C02F 1/441; C02F 1/442; C02F 1/444; C02F 2201/006; C02F 2201/008; C02F 2303/16; C02F 2209/005; C02F 2201/001; C02F 2203/08; B01D 63/16; B01D 61/081; B01D 2313/44; B01D 2315/04; B01D 33/03; B01D 33/0376; B01D 61/1081; B01D 2201/265; B60P 1/5423; B60P 3/28; Y02W 10/37; B66C 23/36; B66C 23/38
  (Continued)

(56) References Cited

U.S. PATENT DOCUMENTS 4,602,989 A   7/1986 Culkin
4,615,786 A   10/1986 Culkin et al.
(Continued)

*Primary Examiner* — Joseph W Drodge
(74) *Attorney, Agent, or Firm* — Skinner and Associates; Joel Skinner

(57) ABSTRACT

A portable fluid filtration system. The portable filtration system includes a trailer having a ceiling with a predetermined height, and having an openable and closeable ceiling passage. One or more filter assembles are disposed in the trailer. Each filter assembly includes a filter base and a filter cartridge connectible and dis-connectible to the filter base. The filter cartridge has a height such that when it is disposed on the filter base, the filter cartridge extends beyond the predetermined height of the trailer ceiling. The system also has a fluid input/output assembly disposed in the trailer and fluidically connected to the at least one filter assembly, the liquid input/output assembly being for receiving fluid to be cleaned and inputting it to the at least one filter assembly and for receiving filtered fluid from the filter assembly and for outputting it. The system further has a rotatable, extendable filter cartridge mover disposed in the trailer, for connecting and disconnecting the filter cartridge to the filter base.

17 Claims, 17 Drawing Sheets

(51) Int. Cl.
 *B60P 1/54* (2006.01)
 *C02F 1/00* (2023.01)
 *C02F 1/44* (2023.01)

(52) U.S. Cl.
 CPC ........ *B01D 2201/265* (2013.01); *C02F 1/441* (2013.01); *C02F 1/442* (2013.01); *C02F 1/444* (2013.01); *C02F 2201/006* (2013.01); *C02F 2201/008* (2013.01); *C02F 2303/16* (2013.01)

(58) Field of Classification Search
 USPC .......................................................... 210/241
 See application file for complete search history.

(56) References Cited

U.S. PATENT DOCUMENTS

| | | | |
|---|---|---|---|
| 4,639,300 A | | 1/1987 | Culkin |
| 4,659,460 A | * | 4/1987 | Muller ................ B01D 15/00 210/93 |
| 4,679,439 A | | 8/1987 | Culkin |
| 4,689,134 A | | 8/1987 | Culkin et al. |
| 4,693,802 A | | 9/1987 | Culkin |
| 4,872,988 A | | 10/1989 | Culkin |
| 4,952,317 A | | 8/1990 | Culkin |
| 5,080,770 A | | 1/1992 | Culkin |
| 5,084,176 A | * | 1/1992 | Davis ................ B01D 33/0315 209/381 |
| 5,632,892 A | * | 5/1997 | Klein ..................... B01D 61/10 210/257.2 |
| 5,725,767 A | | 3/1998 | Culkin |
| 6,132,509 A | * | 10/2000 | Kuschnereit ........... B01D 29/56 239/289 |
| 7,578,930 B2 | | 8/2009 | Williamson |
| 8,137,550 B1 | | 3/2012 | Moe |
| 8,518,268 B1 | | 8/2013 | Nauertz |
| 10,029,922 B2 | | 7/2018 | Segroves |
| 2007/0068889 A1 | * | 3/2007 | Willim ..................... B66C 23/36 212/299 |
| 2007/0084808 A1 | * | 4/2007 | Williamson .............. C02F 9/00 210/241 |
| 2008/0314807 A1 | * | 12/2008 | Junghanns ........... B01D 61/025 210/85 |
| 2009/0250407 A1 | * | 10/2009 | Delano ............... B01F 23/2341 210/241 |
| 2013/0098816 A1 | * | 4/2013 | Elfstrom ................. C02F 1/001 210/153 |
| 2013/0134097 A1 | * | 5/2013 | Oberholtzer .............. C02F 1/42 210/85 |
| 2015/0001161 A1 | * | 1/2015 | Wiemers ............... E21B 43/2607 210/201 |
| 2016/0016825 A1 | * | 1/2016 | Roberts .................. C02F 1/441 210/186 |
| 2016/0097247 A1 | * | 4/2016 | Marco .................. B01D 29/682 166/305.1 |
| 2019/0390574 A1 | * | 12/2019 | Dokic ..................... F01K 23/10 |

* cited by examiner

MOBILE FILTRATION TECHNOLOGY

CROSS-REFERENCE TO RELATED APPLICATIONS, IF ANY

This application claims the benefit under 35 U.S.C. § 119(e) of U.S. Provisional Patent Application Ser. No. 63/074,625, filed 4 Sep. 2020, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to filtration systems, apparatus and methods. Particularly, the invention relates to a mobile filtration system. Most particularly, the invention relates to a mobile filtration system that utilizes Vibratory Shear Enhanced Processing (VSEP).

2. Background Information

Existing technology in this field is believed to have significant limitations and shortcomings. For this and other reasons, a need exists for the present invention.

Vibratory Shear Enhanced Processing (VSEP) is disclosed in U.S. Pat. Nos. 4,602,989, 4,615,786, 4,679,439, 4,872,988, 4,952,317, and 5,725,767. Fixed plant or fixed base commercial filtration systems and components, including filter cartridges, have been manufactured and sold by New Logic Research of Minden, NV USA.

All US patents and patent applications, and all other published documents mentioned anywhere in this application are incorporated by reference in their entirety.

BRIEF SUMMARY OF THE INVENTION

The invention provides a mobile filtration apparatus, method, method of manufacture and method of use which are practical, reliable, accurate and efficient, and which are believed to fulfill a need and to constitute an improvement over the background technology.

The filtration system of the present invention uniquely and securely encloses multiple filter types that weigh in excess of 2,000 pounds each, including micro filters, nano filters, reverse osmosis filters and carbon activated filters along with a 14 ton crane to move and position the filters within the trailer, a leveler system for the trailer, chemical totes for cleaning the filters and all of the electronics to operate the entire system into one portable 53' trailer that is capable of processing up to 420,000 gallons of fluid per day.

One example that demonstrates the need for the mobile filtration system of the present invention is the needs of the Department of Defense (DoD). The DOD has a significant environmental problem at 651 military bases based on the use of toxic Fire Fighting Foam (FFF) that is mixed with water. In excess of 500 million gallons are present in the environment. Aqueous Film Forming Foams (AFFF) are water-based and frequently contain hydrocarbon-based surfactant such as sodium alkyl sulfate, and fluorosurfactant, such as fluorotelomers, perfluorooctanoic acid (PFOA), or perfluorooctanesulfonic acid (PFOS) which are now known cancer causing agents. Recently, at a US Air Force base in Florida, there were 903,000 gallons of AFFF and water that needed to be disposed of. Because there was no mobile or portable filtration equipment that could remediate this problem at the base, over 200 5,000 gallon tanker trucks had to be filled with this water and AFFF and hauled to a dump site 500 miles away. The environmental impact of 200 diesel trucks running, the wear and tear the trucks place on the roadways, and the liability of a tanker truck spill clearly indicate the importance of the portable/mobile filtration equipment of the invention.

With the present invention, the mobile filtration system may be taken directly to the military base to filter the approximately one million gallons of water and AFFF on site. The filtration equipment can filter fluids down to 0.001 microns which remove up to 99% of the AFFF, which is allowable by EPA standards, and yield potable water as an effluent and the AFFF as a separate effluent. By doing this filtration, the toxic fluid volume of AFFF is reduced down to approximately 10,000 gallons from a total of 903,000 gallons. Now, there would only be 2-3 tanker trucks on the roadways instead of 200.

Another problem that exists in the US, and in particular, is the flooding of abandoned coal mine shafts from underground aquifers. Once these aquifers flood the shafts, the resulting water is contaminated with acid as well as other minerals that can be toxic. As the mine shafts flood they overflow and the contaminated water begins to then migrate to surface waters, including rivers, streams, and lakes. With the portable/mobile filtration equipment of the present invention, one can go directly to these mines and filter the contaminated water, dispose of the acid and other minerals and put the filtered potable water directly into a river, stream or lake.

What the present filtration configuration has done and will do for the world is to be able to take it to locations, often times remote, and provide filtration services that could never be done before with the acute levels of filtration with the high volumes our equipment can process.

In one aspect, the invention provides a filtration system, comprising:
- an enclosure;
- at least one filter assembly disposed in the enclosure, including a filter base and a filter cartridge connectible and dis-connectible to the filter base;
- a fluid input/output assembly disposed in the enclosure and fluidically connected to the at least one filter assembly, the fluid input/output assembly being for receiving fluid to be cleaned and inputting it to the at least one filter assembly and for receiving filtered fluid from the filter assembly and for outputting it to an environment outside the filtration system; and a filter cartridge mover disposed in the enclosure, for connecting and disconnecting the filter cartridge to the filter base.

In another aspect, the invention provides a portable fluid filtration system, comprising:
 a trailer having a ceiling with a predetermined height, and having an openable and closeable ceiling passage;
 at least one filter assembly disposed in the trailer, the at least one filter assembly including a filter base and a filter cartridge connectible and dis-connectible to the filter base, and wherein the filter cartridge has a height such that when it is disposed on the filter base, the filter cartridge extends beyond the predetermined height of the trailer ceiling;
 a fluid input/output assembly disposed in the trailer and fluidically connected to the at least one filter assembly, the liquid input/output assembly being for receiving fluid to be cleaned and inputting it to the at least one filter assembly and for receiving filtered fluid from the filter assembly and for outputting it; and
 a rotatable, extendable filter cartridge mover disposed in the trailer, for connecting and disconnecting the filter cartridge to the filter base.

And in a further aspect, the invention provides a portable Vibratory Shear Enhanced (VSEP) fluid filtration system, comprising:
 a. a trailer having a ceiling with a predetermined height, and having an openable and closeable ceiling passage;
 b. at least two filter assemblies disposed in the trailer, each filter assembly including:
  a filter base, and
  a filter cartridge connectible and dis-connectible to the filter base, wherein each filter cartridge has a height such that when it is disposed on the filter base, the filter cartridge extends beyond the predetermined height of the trailer ceiling, and wherein each filter base includes a frame, a vibration drive and a vibration plate;
 c. a fluid input/output assembly disposed in the trailer and fluidically connected to the at least one filter assembly, the liquid input/output assembly being for receiving fluid to be cleaned and inputting it to the at least one filter assembly and for receiving filtered fluid from the filter assembly and for outputting it; and
 d. a rotatable, extendable crane disposed in the trailer, for connecting and disconnecting the filter cartridge to the filter base, wherein the crane includes a base, a hoist/winch assembly, and an extendable and retractable boom, and wherein the hoist/winch assembly is rotatable about the base.

The aspects, features, advantages, benefits and objects of the invention will become clear to those skilled in the art by reference to the following description, claims and drawings.

DETAILED DESCRIPTION

Figure 1:
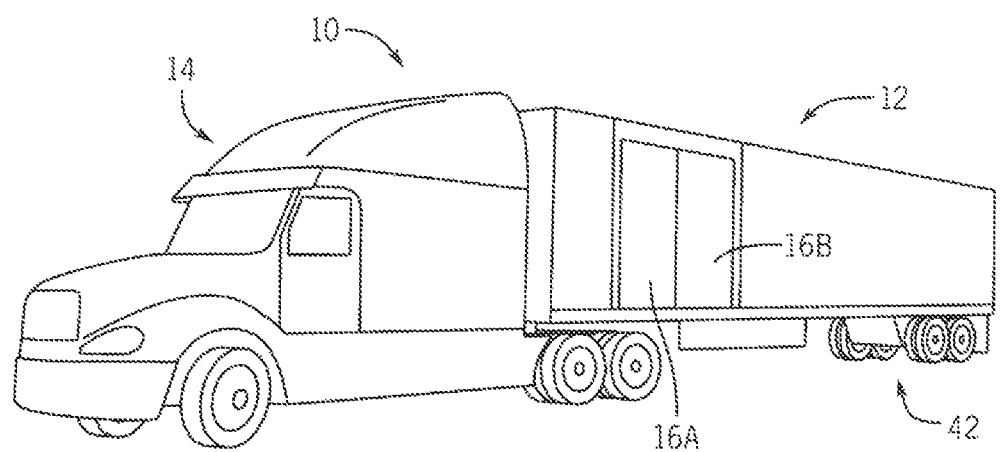
FIG. 1 is a perspective view, from the front, illustrating an embodiment of a mobile filtration system of the present invention, wherein system components are housed in a trailer and coupled for transport to a semi tractor.

The description that follows describes, illustrates and exemplifies one or more embodiments of a mobile filtration system. This description is not provided to limit the disclosure to the embodiments described herein, but rather to explain and teach various principles to enable one of ordinary skill in the art to understand these principles and, with that understanding, be able to apply them to practice not only the embodiments described herein, but also other embodiments that may come to mind in accordance with these principles. The scope of the instant disclosure is intended to cover all such embodiments that may fall within the scope of the appended claims, either literally or under the doctrine of equivalents.

In the description and drawings, like or substantially similar elements may be labeled with the same reference numerals. However, sometimes these elements may be labeled with differing numbers in cases where such labeling facilitates a more clear description. Additionally, the drawings set forth herein are not necessarily drawn to scale, and in some instances proportions may have been exaggerated to more clearly depict certain features.

Figure 2:
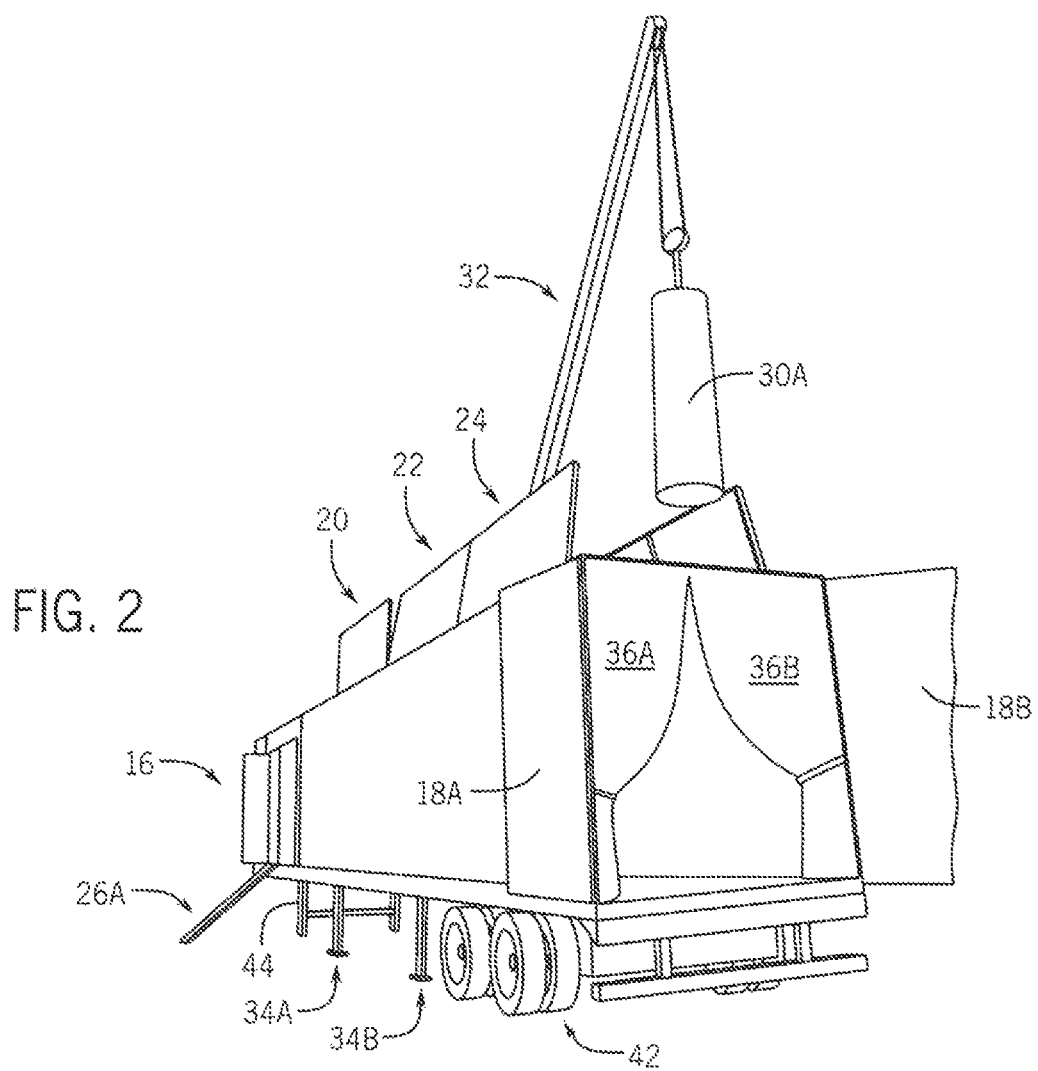
FIG. 2 is a perspective view of the mobile filtration system, taken from the rear end of the trailer, detached from the tractor for deployment, and in an open top state during set up.
Figure 3:
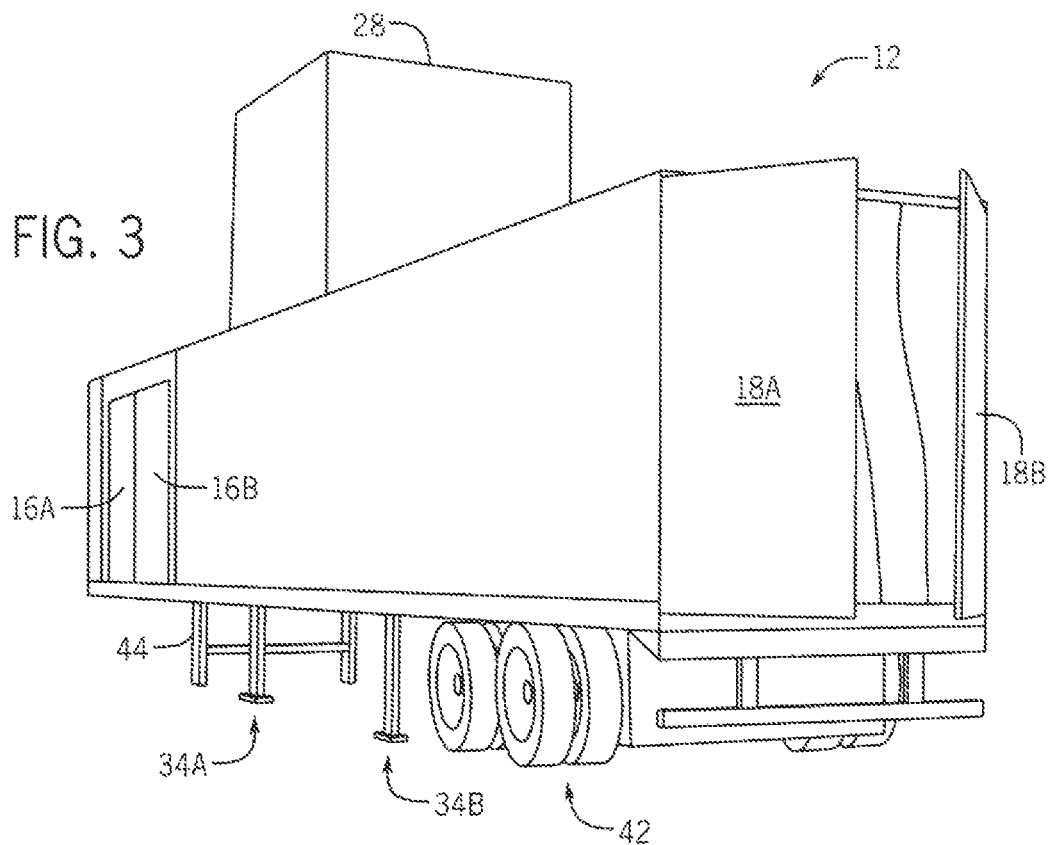
FIG. 3 is a perspective view of the mobile filtration system, from the rear, set up and in an operational processing mode or state with its top doors closed and a foul weather enclosure attached to the top of the trailer.
Figure 4:
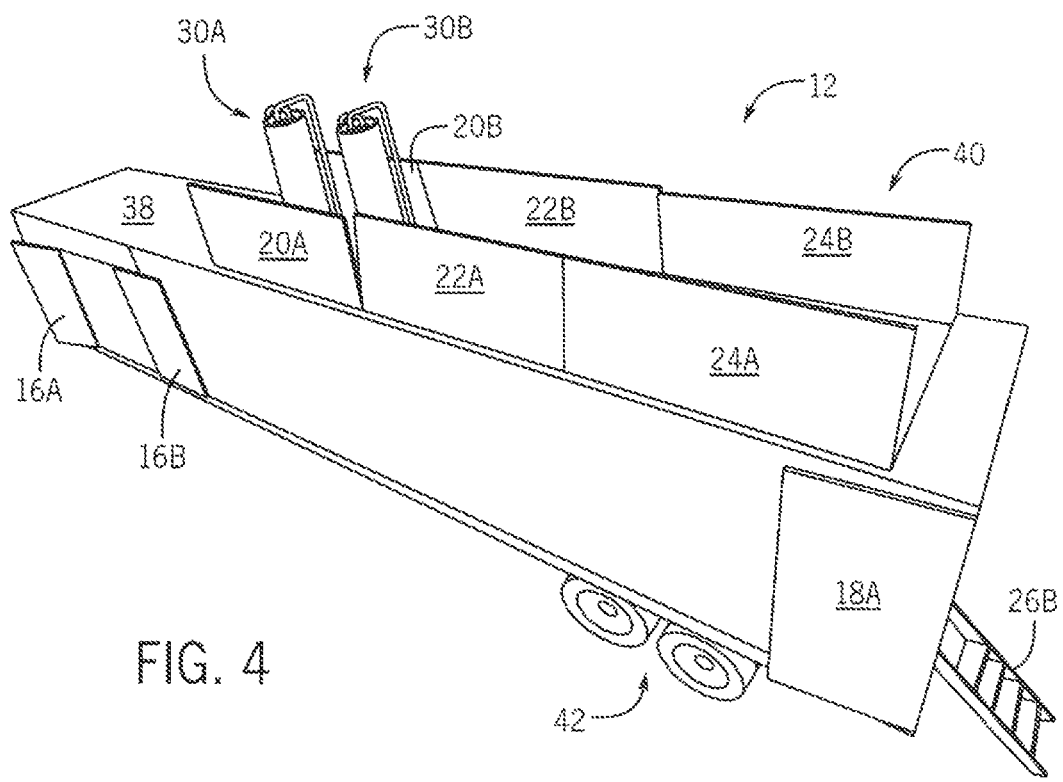
FIG. 4 is a perspective view of the system, from the rear and slightly above, in an operating state with trailer ceiling doors open, after set up.

Referring to FIGS. 1-4, one embodiment of the mobile filtration system 10 of the present invention comprises a trailer 12 and a semi-tractor 14. FIG. 1 shows the trailer 12 coupled for transport to a semi-tractor 14. FIGS. 2-4 show the trailer 12 decoupled from the tractor 14 in three (3) states of deployment. The trailer 12 has a rectilinear configuration well known in the transportation industry, with front and rear ends 13 and 15, a floor 17, a ceiling 19 and side walls 21 A/B. The trailer 11 embodiment shown herein has an interior enclosure 53 foot long, 110 (9.16 foot) inches high, and 100 inches wide. This a small area in which to house, and permit work by personnel with, required filtration equipment, particularly filtration equipment which is capable processing industrial, municipal, and military liquids and other fluids, including Fire Fighting Foams. In particular, the height of the space is short to house and operate tall filtration equipment and components. The rear door 16 opening is 98 inches by 110 inches. The side door opening is also approximately 98 inches by 110 inches. A set 42 of tire/wheel pairs is disposed at the rear of the trailer 12 and a retractable front stand 44 is disposed at the front of the trailer 12. A pair of doors 18 A/B are disposed at the rear of the trailer 12 defining a main rear opening. The opening also preferably has a plastic strip-type curtain doors 36 A/B for ease of ingress and egress by personal during processing. The rear opening 18 also has a stairs 26 B which is deployed during processing and may be removed or retracted during transport. A pair of side doors 16 A/B are preferably disposed proximate the front of the trailer at the left side (facing the front) of the trailer 12. The side door 16 also has a stairs 26 A, and may have a strip-type curtain door (not shown). Significantly, the trailer 12 has an open top area 40 that is covered by a set (preferably three (3)) of ceiling panels, doors, or hatches 20 A/B, 22 A/B, and 24 A/B that may be opened for set up and closed for transport and/or processing, preferably by powered hydraulic means. The panels are preferably constructed of metal and are preferably insulated. A portion of the front of the trailer 12 preferably has a rigid ceiling 38 covering certain fixed components of the system 10.

In FIG. 2, the trailer 12 is being set up for use wherein one of two tall filter cartridges or canisters 30 A and B are being moved from a transport position inside the trailer 12 to a processing position by a crane 32 disposed in the trailer 12, thru the ceiling opening 40, all three sets of hatches 20 A/B, 22 A/B and 24 A/B having been opened. The tall filter cartridges are 84.0 inches (213.4 cm.) or seven (7) feet. The processes of set up, filtration, and take down are described in detail below. FIG. 4 shows the trailer 12 in a state after the two filter cartridges 30 A and B have been moved into operative positions in the trailer 12, and wherein crane 32 has been retracted and stored. The ceiling panels 20, 22 and 24 remain open. Depending upon weather conditions, filtration processing may occur with all or some of the panels 20, 22, and 24 open, permitting air movement and release of any heat and/or humidity generated by filtration. If needed panels 22 A/B and 24 A/B may be closed to repel rain, snow, wind, and sunlight, or to prevent insects or animals from entering the trailer 12. The trailer 12 preferably has a set (preferably at least four (4) stabilizers 34 that may be deployed from the bottom of the trailer 12 to level the trailer 12 and hold it in a steady, stable position during processing. As shown, front left side stabilizer 34 A is disposed proximate the front of the trailer 12 and rear left side stabilizer 34 B is disposed proximate the rear of the trailer 12. Front and rear right side stabilizers are not shown. The stabilizers 34 are adjustable to conform to changes in the paved or unpaved road, lot or other environmental surface upon which the trailer 12 is disposed for use. Adjustments to level can also be made as a result of and during processing. And the stabilizers 34 are retractable for transport. Level operational stability is important to optimum functionality of the Vibratory Shear Enhanced Processing (VSEP) filtration utilized by the system of the invention. The combination of the trailer 12 tire set 42, front stand 44 and plural stabilizers 34 provides maximum leveling and stability for VSEP filtration in a variety of filtration applications and in a variety of locations and conditions. FIG. 3 shows the trailer 12 from the rear end, set up and in a processing mode with ceiling panels 22 A/B and 24 A/B closed, and with an optional filter cartridge enclosure 28 attached to the top, covering the filter cartridges 30 A/B and the open ceiling panels 20 A/B. The enclosure 28 surrounds panels 20 A/B and the filter cartridges 30 A/B and results in a fully contained system relative to the outside. This is useful to completely repel weather and/or pests, and for security purposes.

Figure 5:
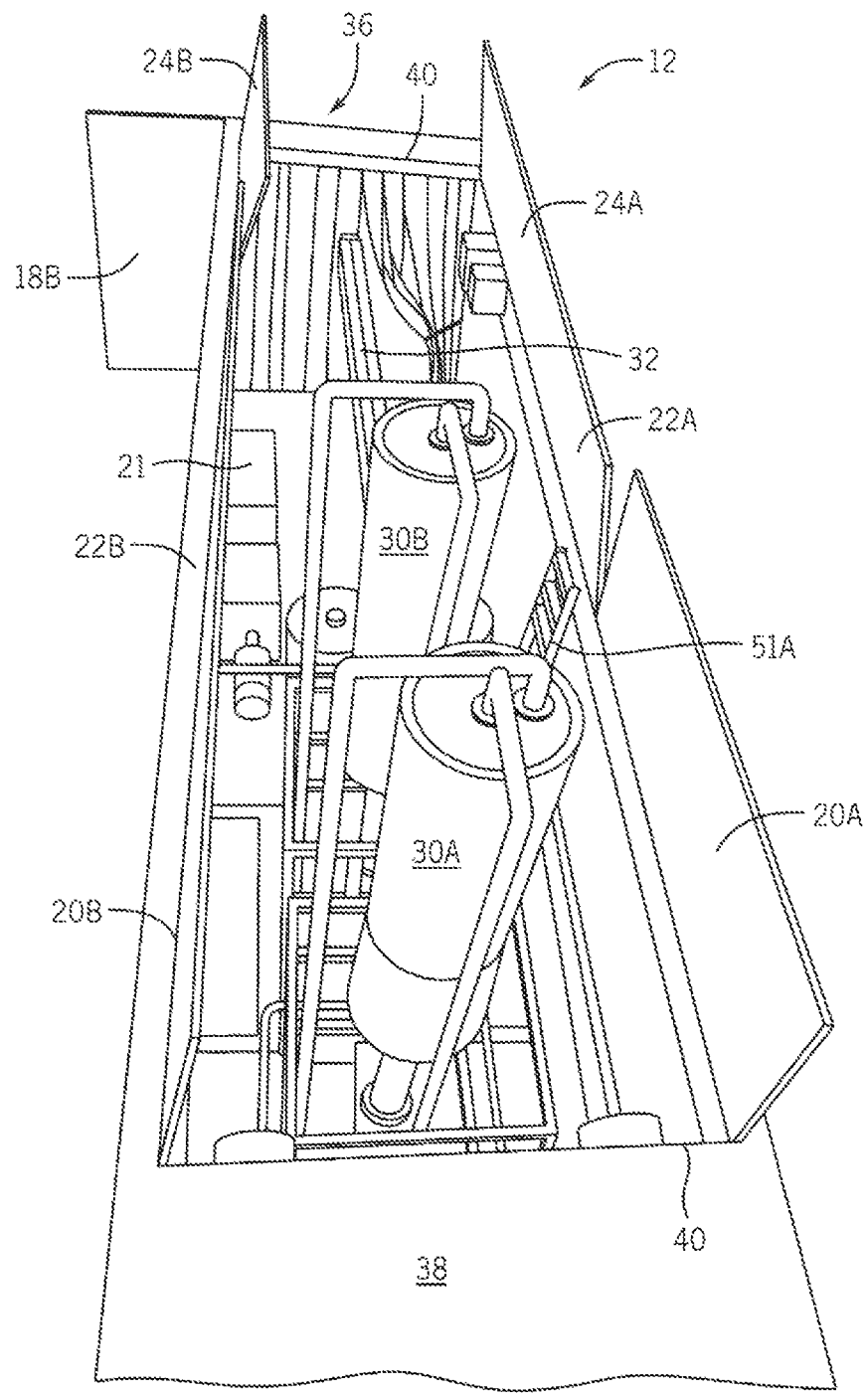
FIG. 5 is a top view, from the front and looking rearwardly, of the open rear area of the trailer, with its filter cartridges installed for processing.
Figure 6:
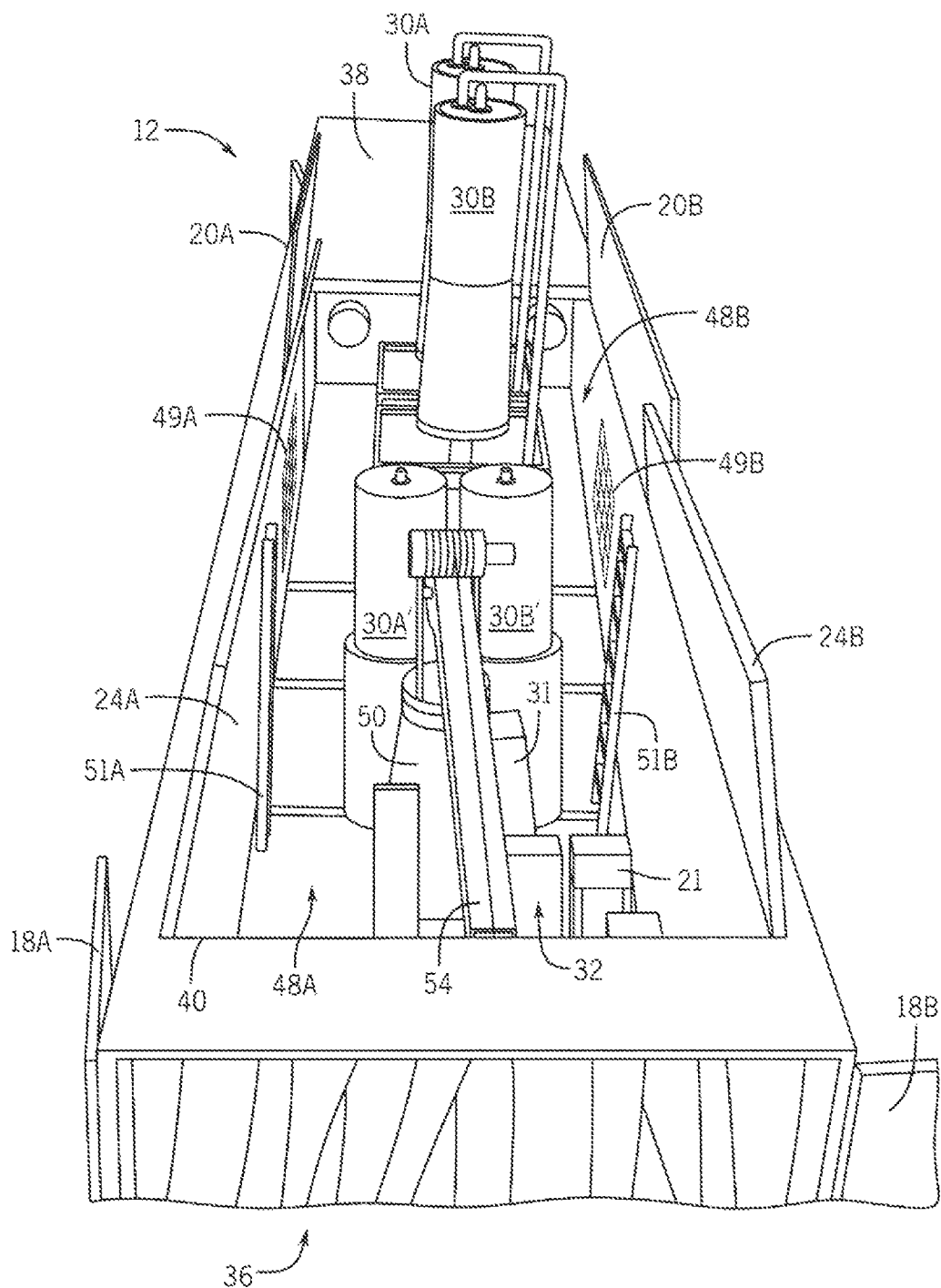
FIG. 6 is a top view of the system including a crane, transport mode filter cartridges, and installed (operational) filter cartridges, through the open
Figure 11:
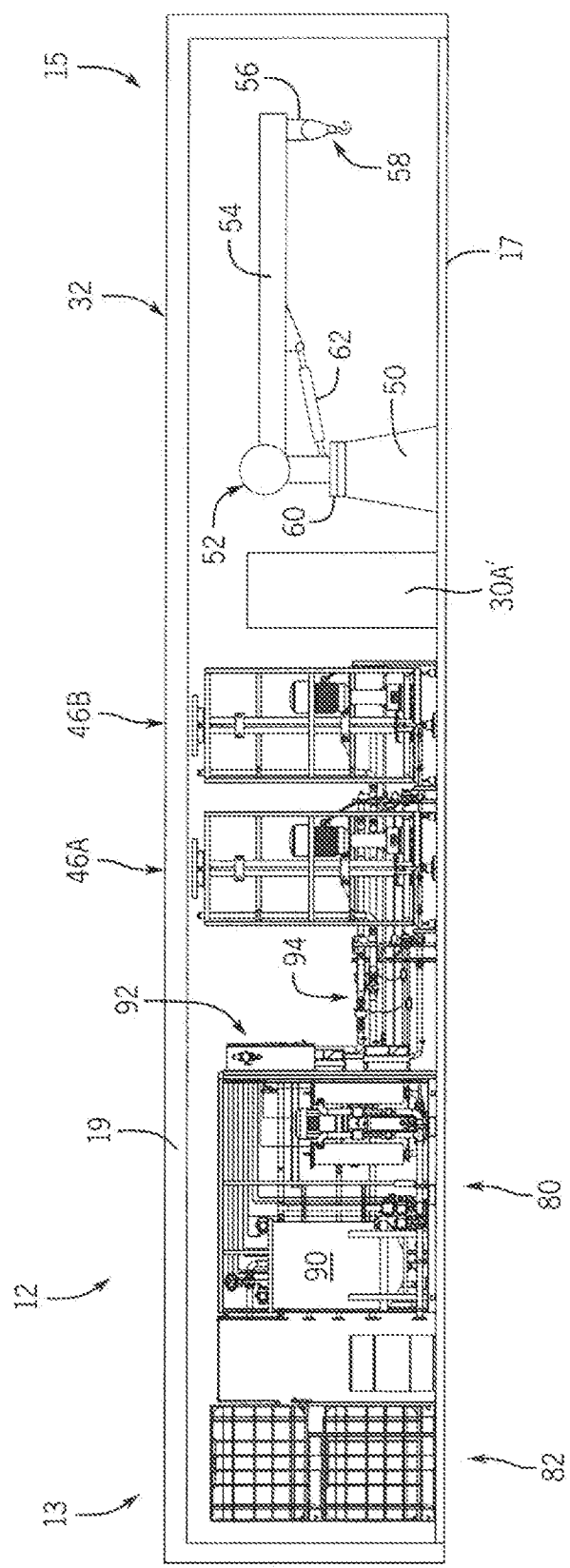
FIG. 11 is a side elevation view of the components of the system, wherein components of the system are stowed for transport.

FIG. 11 shows the system 10 in a transport or storage mode wherein the filter canisters 30' are disposed at a lower location (side by side) in front of the crane 32 and behind tandem, in-line canister bases or stands 46 A/B. FIGS. 4, 5 and 6, the system 10 is in a fully set up processing mode wherein the filter canisters 30 have been moved onto stands 46 A/B respectively. FIG. 5 shows the interior of the rear ward end of the trailer 11 through the open ceiling panels 20, 22 and 24, from a rearward perspective, and FIG. 6 shows the interior from the forward perspective. The rear end of the trailer 12 with the rear trailer doors 18 A/B open and the top 40 open so that the filter cartridges 30 A and B have been moved from a side by side transport position (designated as prime or (')) to a tandem, in line processing position. After processing is finished, the set up process is reversed to take down the tandem filter cartridges 30 A/B and stow them in the trailer 12 for secure storage or transport in the side by side positions 30 A/B' to a new worksite.

Interiorly, the trailer 12 has left 48 A and right 48 B side walkways which permit movement of personnel and materials within the tight confines of the trailer 12. In the embodiment shown, the walkways have a minimum width of 2 feet. The trailer 12 preferably has an elevated walkway 49 A/B disposed on each side, a predetermined distance above the floor walkways 48. The elevated walkways permit personnel to access (for inspection and maintenance) system components that are located above the floor level, particularly the tall, filter canisters 30. An embodiment of the elevated walkways 49 is shown in FIG. 6, wherein they are in a folded position proximate the side walls of the trailer 12. When needed, they are attached to the sidewalls of the trailer 12, or example by brackets or pivotally, to provide an elevated walking surface. When not needed, they are conveniently stowed closely to the side walls, where they remain securely held or retracted, clearing the normal, lower walkways 48. Access is provided to the elevated walkways 49 via ladders 51 A/B. The ceiling hatches 20, 22, and 24 are preferably operated by manifold assembly 21. operates the hatches of the ceiling. Again, hatches 20, 22, and 24 are closed during transport and opened to operate the crane 32 and deploy the filter cartridges 30.

Figure 7:
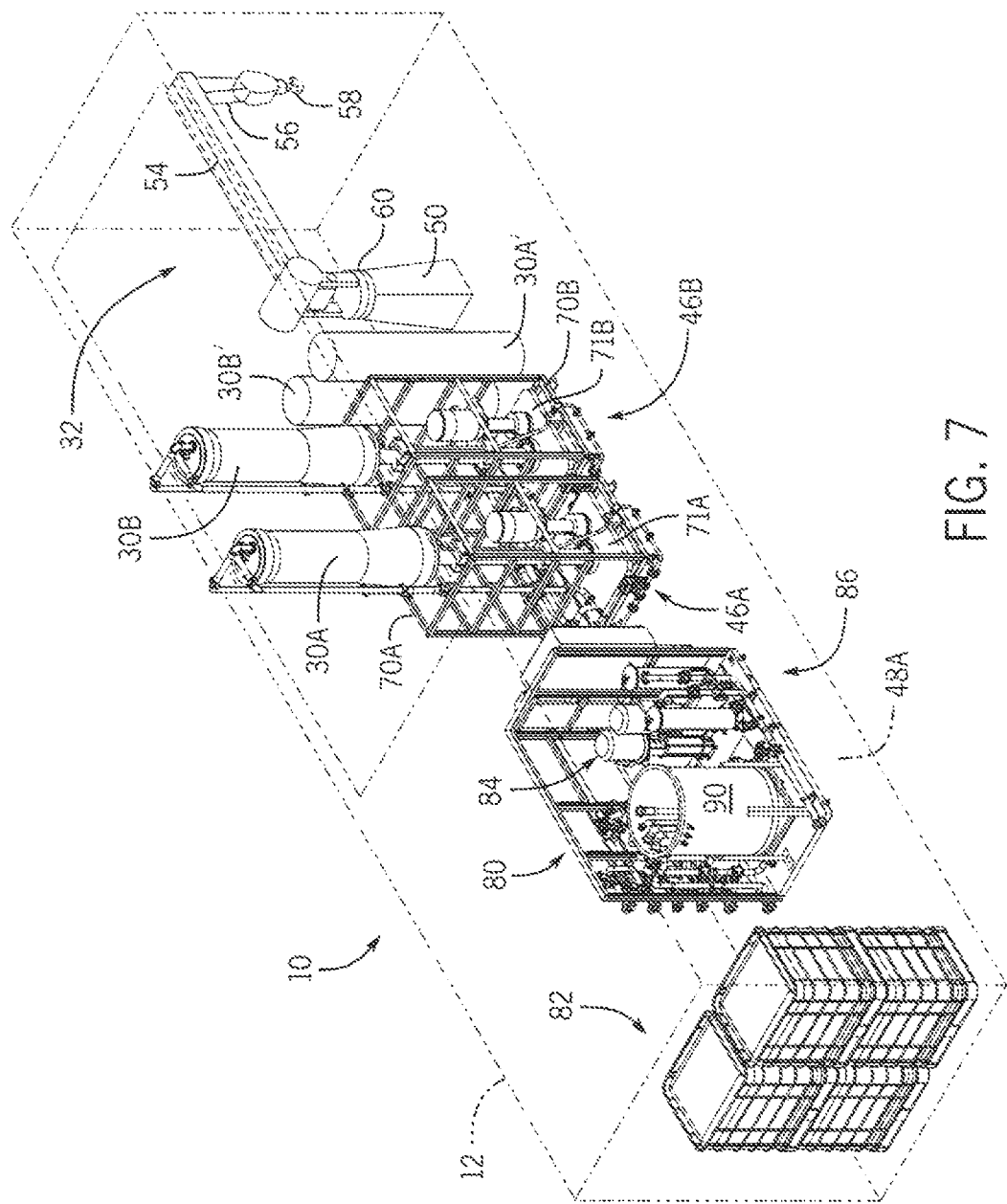
FIG. 7 is an isometric view, taken from the front of the trailer of the system, of an embodiment of various components of the system, with two filter cartridges set up in an operational state.
Figure 8:
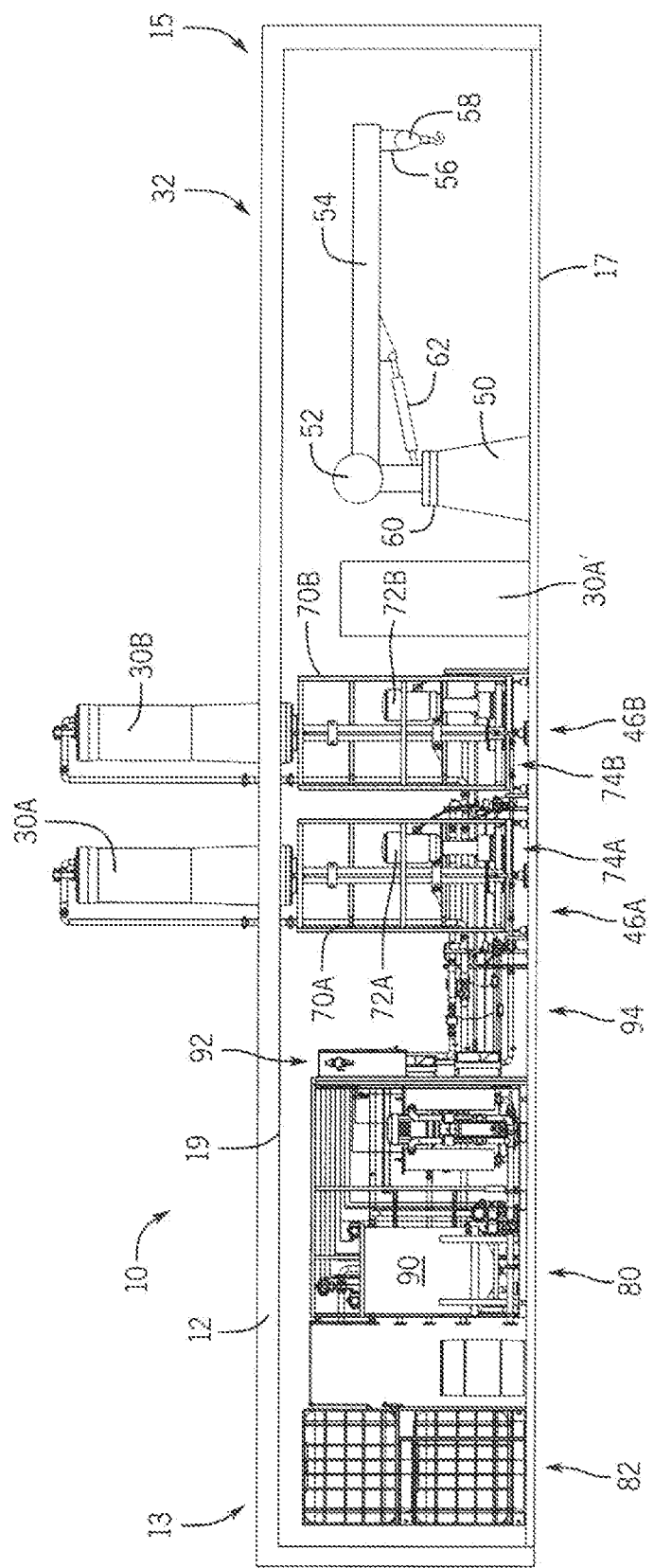
FIG. 8 is a side elevation view of the components of the system, wherein two filter cartridges are set up for operation.
Figure 9:
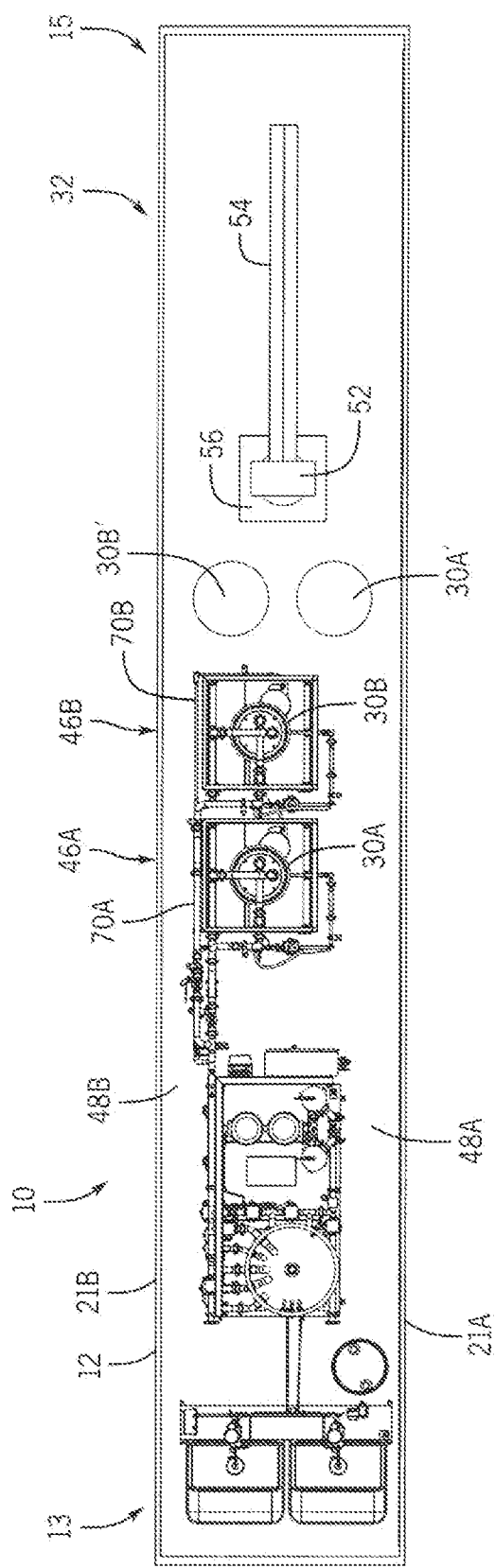
FIG. 9 is a top view of the components of the system of FIG. 8.

Referring also to FIGS. 7-9 the crane 32 is disposed generally at the rear end of the trailer 12. The crane 32 includes a base 50, a hoist/winch assembly 52, an extendable/retractable boom 54, a cable 56 and a distal hook assembly 58. The base 50 is fixed to the floor of the trailer 12 along its midline. The hoist/winch assembly 52 is disposed on top of the base 50 and is rotatable thereon by way of a pedestal/bearing assembly 60. This permits forward and rearward movement of the boom 54 of the crane 32 relative to the trailer 12. The boom 54 extends from the hoist/winch assembly 52 and has a predetermined length such that it is stowable in the trailer 12, and yet can be actuated to move the filter canisters 30 from the stowed positions 30' to the operable positions 30, and vice versa. The hoist feature raises the boom under control of an operator/user, and the winch feature both extends and retracts the boom, and moves the cable 56 with respect to the boom 54 to raise and lower the attached distal hook assembly 58. A gas spring unit 62 preferably buffers the pivot force on the boom caused by lifting the filter canisters 30. In the embodiment shown, the boom 54 has a retracted length of 13 feet, and a maximum extended length of 30 feet. An exemplary crane 32 is NEXSTAR Model 14005H provided by Auto Crane of Tulsa, Oklahoma USA. Details of the construction and function of such crane are disclosed in Owner's Manual No. 47012010 (Published 2010), which is incorporated by reference hereby. In use, the crane 32 moves the filter canisters from a lower location(s) 30' where they are being stored or transported to an upper location(s) 30. The crane 32 also permits adding canisters from outside the trailer 12 or removing canisters from the trailer 12. The crane 32 is preferably controlled by Variable Frequency Drives (VFD) 31. VFDs are similar to rheostats and regulate the amount of power to the crane 32 motor to speed or slow rotational and longitudinal movement of the boom 54, and cable 56 movement.

Figure 17:
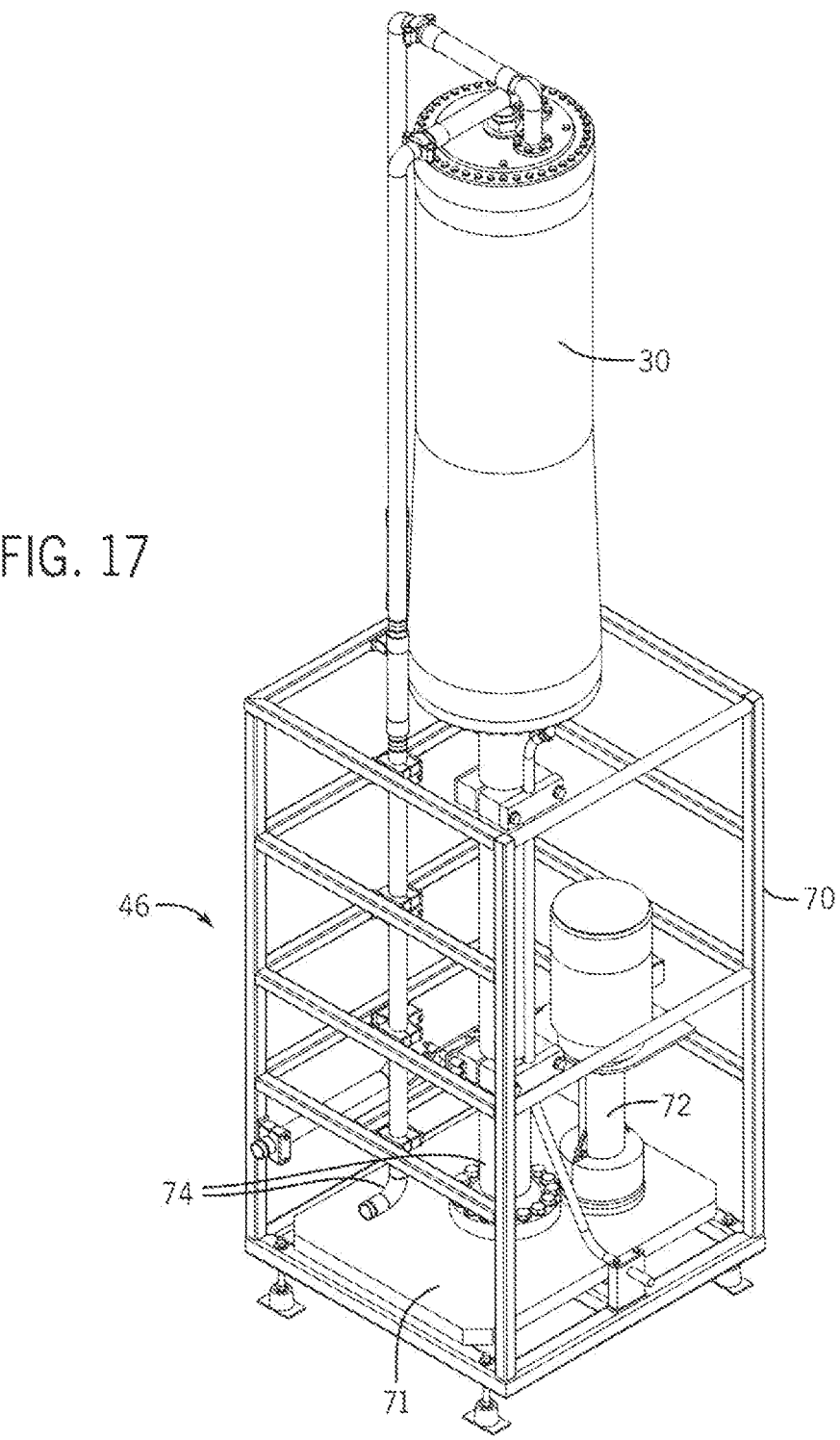
FIG. 17 is a detailed perspective view of a filter assembly including a filter cartridge operationally disposed on a base or stand.

Turning now to the primary filtering aspects and components of the filtration system 10 of the invention, FIGS. 7, 8 and 9 show perspective, elevation and top views of tall, transportable, cleanable, and replaceable filter canisters 30 A/B in an operative position disposed on tandem, in-line vibration stands 46. The tall filtration members 30 extending thru the open top 40 of the trailer 12. For ease of viewing, the ceiling panels have been removed. The filter canisters are most preferably VSEP canisters with internal VSEP membranes. Exemplary VSEP canisters are manufactured and provided by New Logic Research of Minden, Nevada USA. Referring also to FIG. 17, the vibration bases or stands 46 A/B are important to the function of the canisters 30. Significantly, the stands 46 A/B are 99.4 inches (252.5 cm.) or 8.29 feet high and must be that height in order to perform their function. Thus, when a seven foot high cartridge 30 is operatively disposed on the stand 46, the combined height is 194.17 inches (493.2 cm.) or 16.18 feet. This significantly exceeds the 9.16 foot ceiling height of the trailer 12. Thus, when in an operative mode, the top of the cartridges 30 extends 75 inches (6.25 feet) beyond the trailer 12 through the opening 40. The stands 46 include a tall frame 70 A/B, an electric vibration drive 72 A/B, a vibration base plate 71 A/B, and input/output plumbing assemblies 74 A/B. The frames 70 are constructed of rigid members and mount the canisters 30 firmly to the floor of the trailer, a predetermined height above the floor. The vibration drives 72 are shown in this embodiment fixed to vibration base plates 70 and the frames 70. The canisters 30 are fluidically connected to the input/output plumbing assemblies 74.

Figure 10:
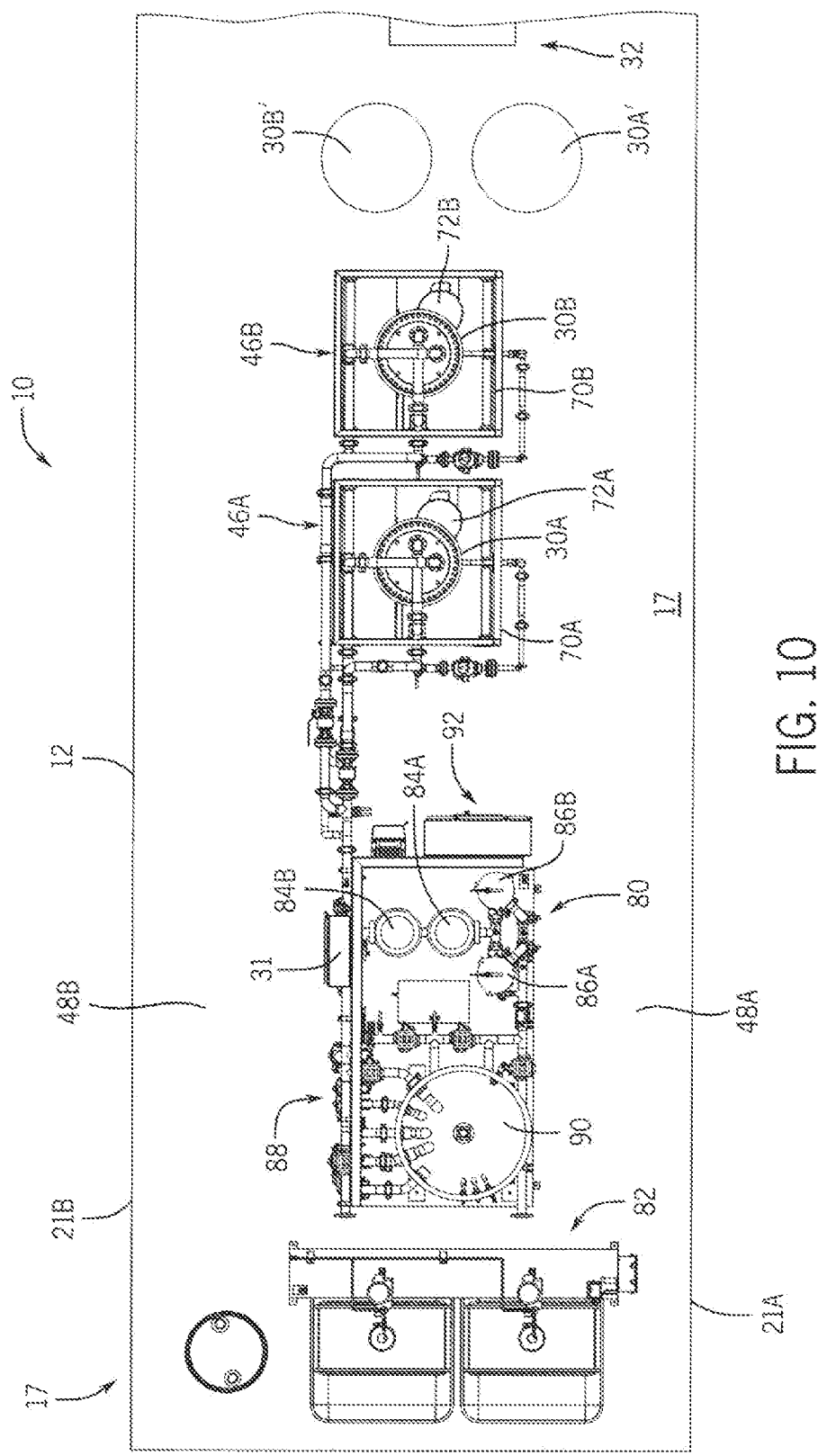
FIG. 10 is detailed view from the top of components of the system disposed at the front end of the trailer.
Figure 12:
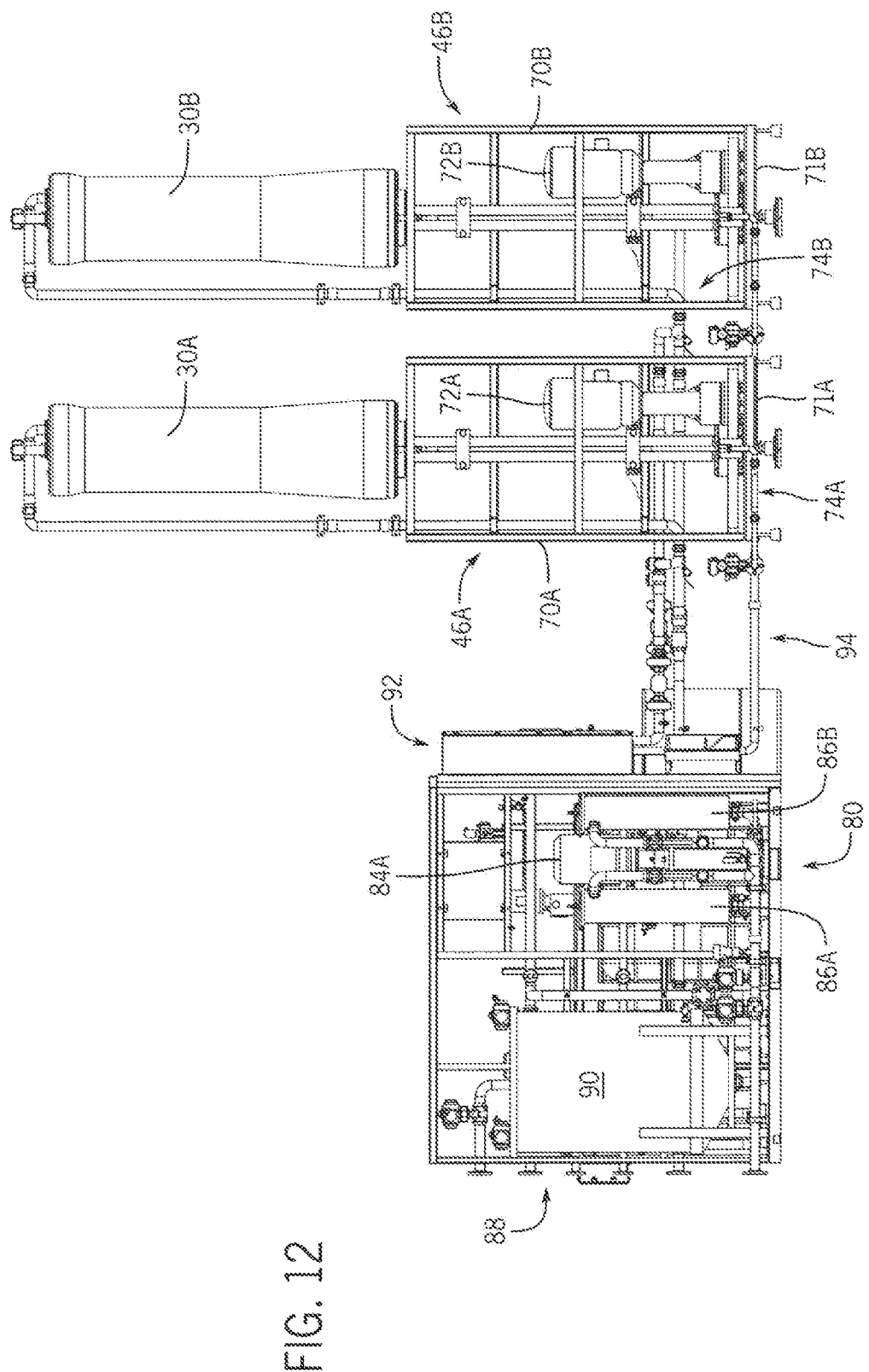
FIG. 12 is a detailed front elevation view of pumping and filtering components of the system in an operational state.
Figure 15:
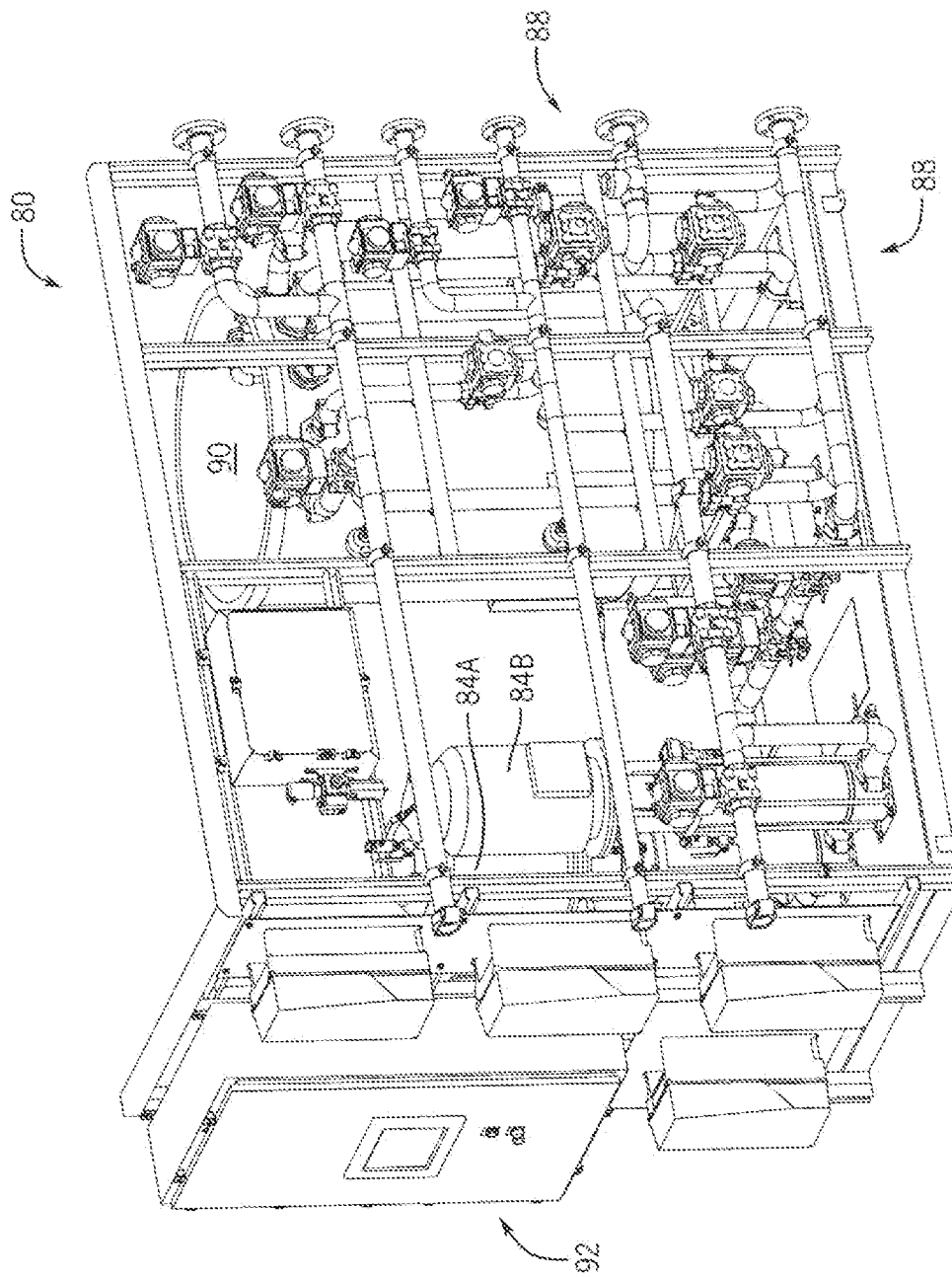
FIG. 15 is a detailed perspective, back side, view of an embodiment of electronic control, pump, valve and cleaning or CIP elements of the system.
Figure 16:
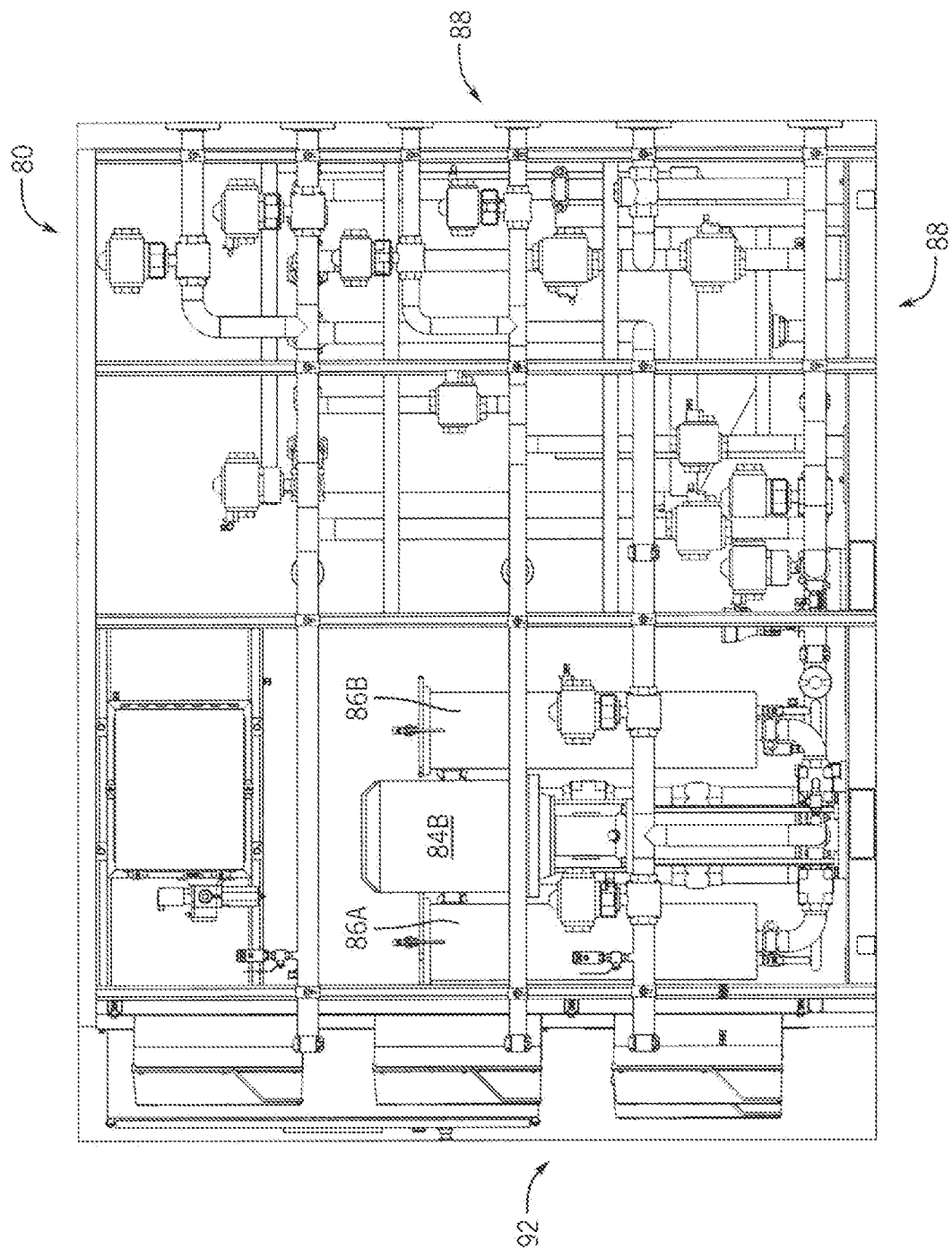
FIG. 16 is an elevation view of the components shown in FIG. 15.

Referring also to detailed top and elevation views in FIGS. 10 and 12, the VSEP filtration components of this embodiment of the invention further include a fluid feed assembly 80 and a cleaning fluid supply assembly 82. The feed assembly includes feed pumps 84 A/B; filters 86 A/B (preferably sock filters) connected to the pumps, a plumbing assembly 88 fluidically connected to the pumps 84, to a supply of liquid to be filtered, and to a clean fluid output; a Clean-In-Place tank 90 connected to the plumbing assembly 88; and a control system 92. The control system 92 is communicatively connected to the pumps 84 and to the plumbing assembly via various sensors. The feed assembly 80 is fluidically connected to the vibratory filter units 46 A/B via input/output connectors 94 fluidically connected to the plumbing assembly 88 and the input/out plumbing assemblies 74 of the vibratory filter units 46. FIGS. 15 and 16 show details of the embodiment of the plumbing assembly 88. In the feed assembly 80, effluent (permeate) and concentrate (overflow) fluid flows through the filters 86. Fluid that passes through the filters 86 is effluent/permeate and anything that does not flow through the filters 86 is the concentrate which is discarded.

Figure 13:
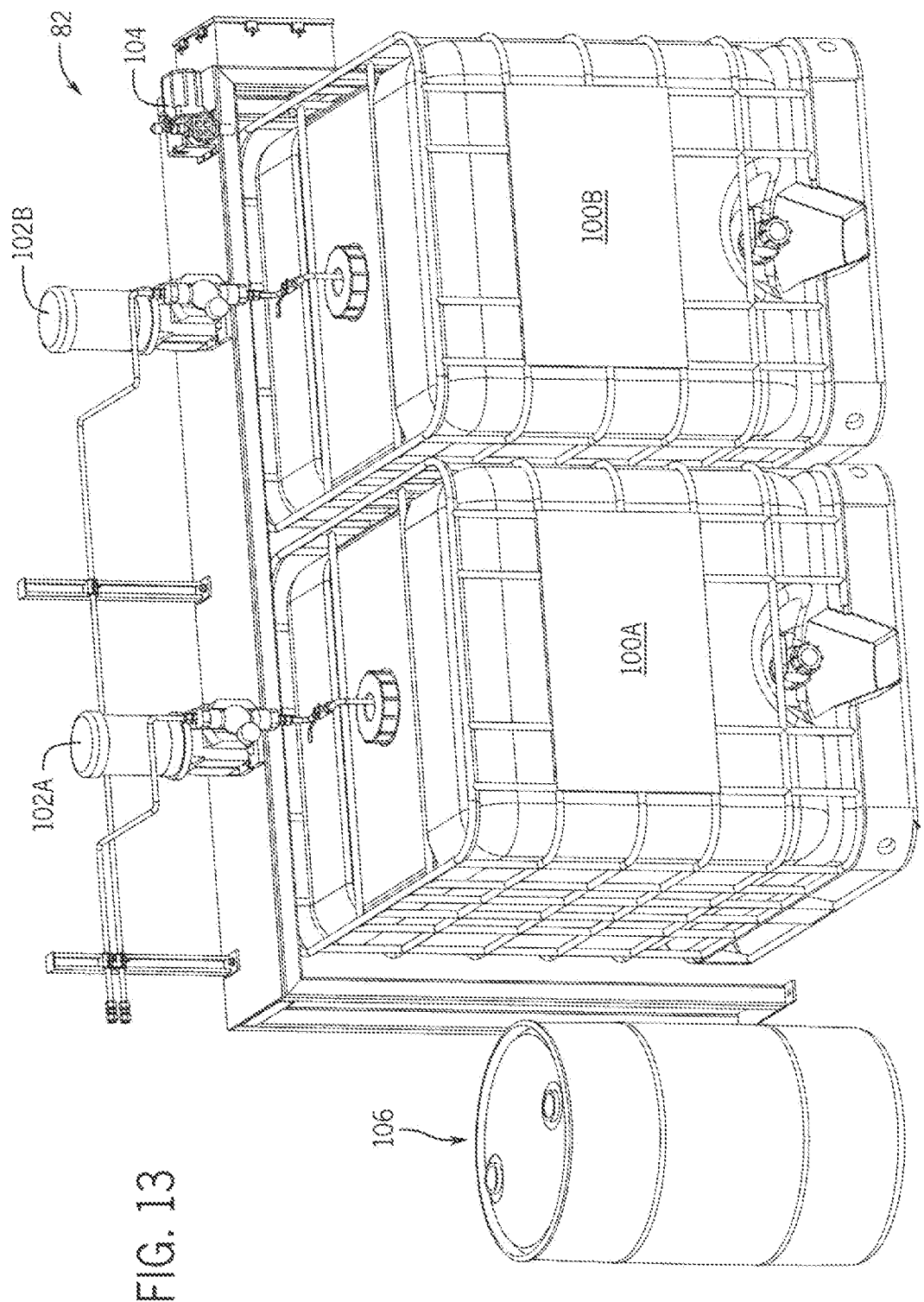
FIG. 13 is a detailed perspective view of an embodiment of a portion of the chemical solvent containers of the system.
Figure 14:
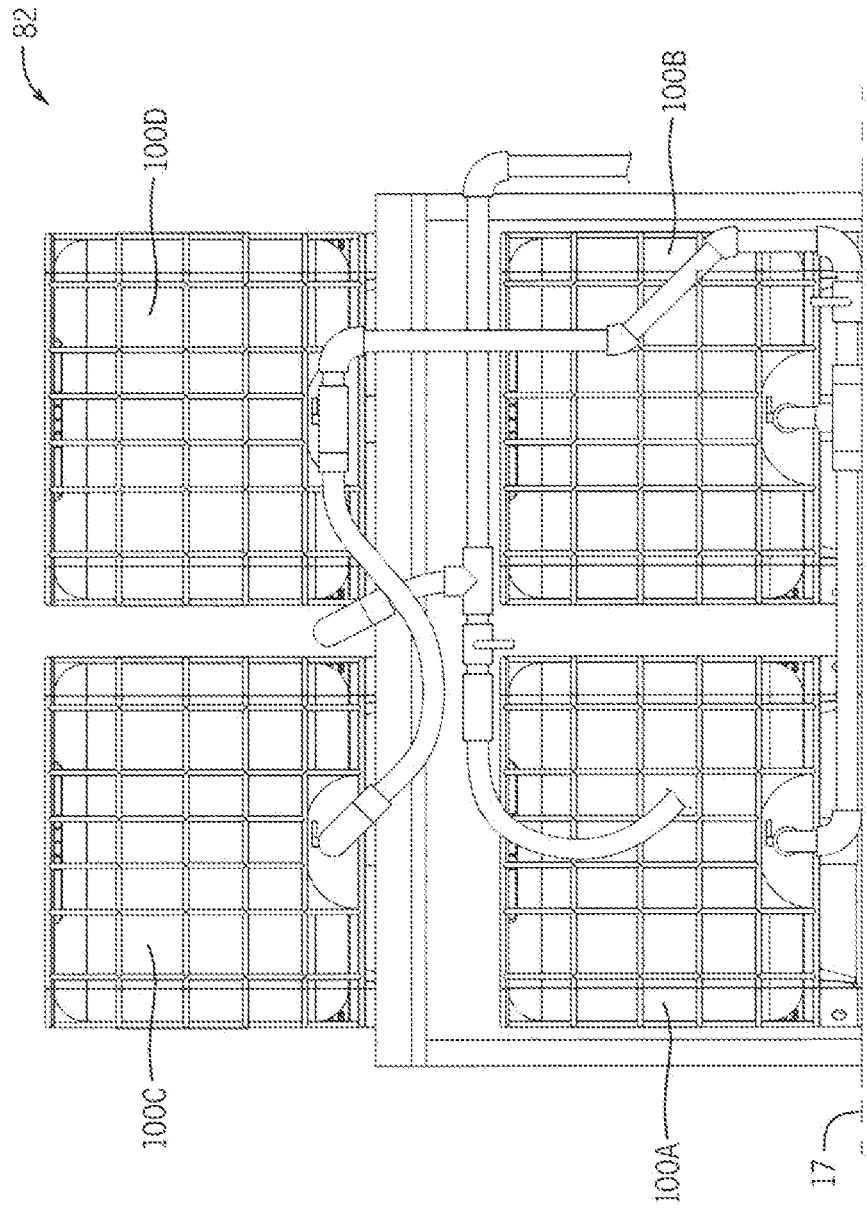
FIG. 14 is a detailed, front elevation view of an embodiment of a full set of chemical solvent containers of the system disposed at the forward end of the trailer.
Figure 18:
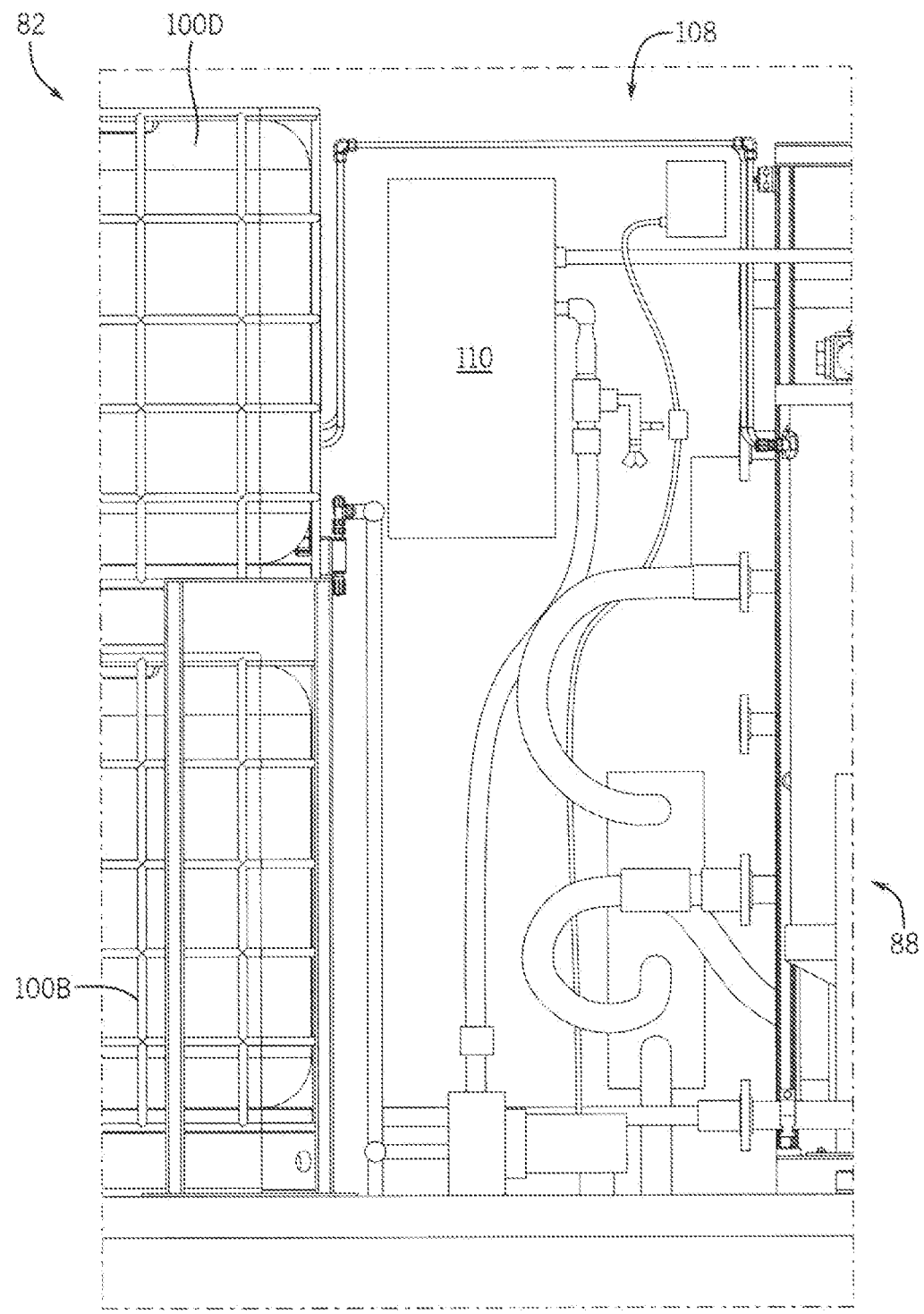
FIG. 18 is a detailed front elevation view of an embodiment of a water heating assembly of the system.

Referring also FIGS. 13, 14 and 18, a preferred embodiment of the cleaning fluid supply assembly 82 includes four cleaning fluid tanks 100 A, B, C and D (preferably polymeric, ISO totes), a pair of supply pumps 102, a metering controller 104, an external cleaning container 106 (preferably a metal drum), and a water heating assembly 108, which preferably includes a tankless water heater 110. In this embodiment of the assembly 82, the lower two totes 100 A and B contain water to pass through the hot water heater 110 to 120 F used for cleaning. In the top containers, container 100 C contains an acid, and the other 100 D a base chemical. The acid and base chemicals are mixed in external container 106. This combination is used to periodically clean the membranes of the filter cartridges 30. Pumps 102 and metering controller 104 are communicatively connected to controller 92

Figure 19:
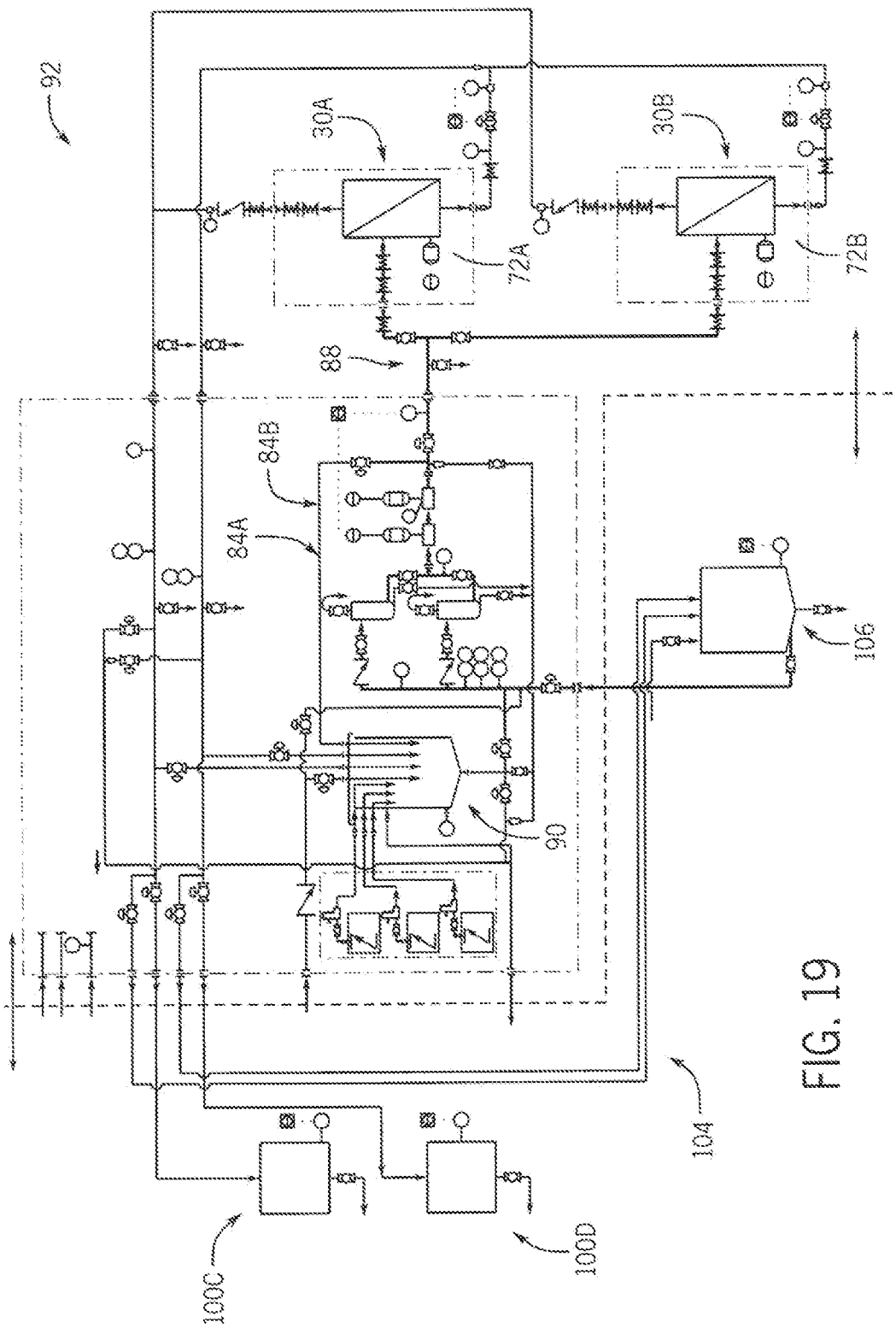
FIG. 19 is a circuit schematic diagram of an embodiment of electronic control features of the system.

FIG. 19 is diagram of an embodiment of the controller 92 for the system 10. Standard power to the system 10 is 4400 VAC. However, since some components operate on 440 VAC, 220 VAC and 110 VAC, drop down transformers are used to power the other components or areas of the system 10.

Theory of Operation

The system 10 of the invention provides on-site Filtration Services with a Portable/Mobile equipment anywhere that has access to a 53 foot tractor trailer 12. The system 10 if capable of filter up to 420,000 gallons a day of fluid. Large jobs can be tackled in shorter times and without the need of vast amounts of tanker trucks to haul contaminated fluid away to disposal sites, reducing the carbon footprint while generating near potable to potable water that can be re-used or put back into the ground, streams, lakes, rivers, aquifers or sanitary sewer systems.

While membrane-based separations of liquids from solids have enjoyed increasing popularity over the last 20 years, the technology has an inherent Achilles heel that affects all membrane devices: fouling. This long-term loss in throughput capacity is due primarily to the formation of a boundary layer that builds up naturally on the membranes surface during the filtration process. In addition to cutting down on the flux performance of the membrane, this boundary or gel layer acts as a secondary membrane reducing the native design selectivity of the membrane in use. This inability to handle the buildup of solids has also limited the use of membranes to low-solids feed streams.

To help minimize this boundary layer buildup, membrane designers have used a method known as tangential-flow or cross-flow filtration that relies on high velocity fluid flow pumped across the membranes surface as a means of reducing the boundary layer effect. In this method, membrane elements are placed in a plate-and-frame, tubular, or spiral-wound cartridge assembly, through which the substance to be filtered (the feed stream), is pumped rapidly. In cross-flow designs, it is not economic to create shear forces measuring more than 10-15 thousand inverse seconds, thus limiting the use of cross-flow to low-viscosity (watery) fluids. In addition, increased cross-flow velocities result in a significant pressure drop from the inlet (high pressure) to the outlet (lower pressure) end of the device, which leads to premature fouling of the membrane that creeps up the device until permeate rates drop to unacceptably low levels.

The Filtration System 10 of the invention, however, has an alternative method for producing intense shear waves on the face of a membrane which uses a vibratory technique. In the Filtration System 10 of the invention, the feed slurry remains nearly stationary, moving in a leisurely, meandering flow between parallel membrane leaf elements. Shear cleaning action is created by vigorously vibrating the leaf elements in a direction tangent to the faces of the membranes.

The shear waves produced by the membrane's vibration cause solids and foulants to be lifted off the membrane surface and remixed with the bulk material flowing through the membrane stack. This high shear processing exposes the membrane pores for maximum throughput that is typically between 3 and 10 times the throughput of conventional cross-flow systems. The membrane filter pack of the invention consists of leaf elements arrayed as parallel discs and separated by gaskets. The disc stack resembles records on a record changer with membrane on each side.

The disk stack is oscillated above a torsion spring that moves the stack back and forth approximately ⅞ inches (2.22 centimeters). This motion is analogous to the agitator of a washing machine but occurs at a speed faster than that which can be perceived by the human eye. The oscillation produces a shear at the membrane surface of about 150,000 inverse seconds (equivalent to over 200 G's of force), which is approximately ten times the shear rate of the best conventional cross-flow systems. More importantly, the shear in the System is focused at the membrane surface where it is cost effective and most useful in preventing fouling, while the bulk fluid between the membrane disks moves very little.

Because the system 10 does not depend on feed flow induced shearing forces, the feed slurry can become extremely viscous and still be successfully dewatered. The concentrate is essentially extruded between the vibrating disc elements and exits the machine once it reaches the desired concentration level. Thus, the system 10 can be run in a single pass through the system, eliminating the need for costly working tanks, ancillary equipment and associated valving.

Each of the two disc pack holdup volume of a system with each up to 1,500 SF (130 sq. meters) of membrane area is less than 50 gallons (189 liters) for each filter. As a result, product recovery in batch processes can be extremely high. Waste after draining the stack is less than 3 gallons (11 liters).

Turning to the method of operation of the system, at startup, the system 10 is fed with a slurry and the concentrate valve is closed. Permeate is produced and suspended solids in the feed are collected inside our filter pack(s). After a programmed time interval, valve one is opened to release the accumulated concentrated solids. The valve is then closed to allow the concentration of additional feed material. This cycle repeats indefinitely.

Membrane selection is a significant parameter that affects the quality of the separation. Other important parameters that affect system performance are pressure, temperature, vibration amplitude, and residence time. All of these elements are optimized during pre-start up testing and entered into the programmable logic controller (PLC) 92 which controls the system 10.

The operating pressure is created by the feed pumps 84. The system 10 can routinely operate at pressures as high as 1,000 psig (68.95 BAR). While higher pressures often produce increased permeate flow rates, they also use more energy. Therefore, an operating pressure is used that optimizes the balance between flow rates and energy consumption.

In most cases, the filtration rate can be further improved by increasing the operating temperature. The temperature limit on the System 10 is 175° F. (79° C.), significantly higher than competitive membrane technology. The system 10 can even create higher temperature constructions if needed.

The vibration amplitude and corresponding shear rate can also be varied which directly affects filtration rates. Shearing is produced by the torsion oscillation of the filter stack. Typically the stack oscillates with an amplitude of ¾ to 1¼ inches (1.9 to 3.2 cm) peak to peak displacement at the rim of the stack. The oscillation frequency is approximately 53 Hz and produces a shear intensity of about 150,000 inverse seconds.

Feed residence time is set by the frequency of the opening and closing of the exit valve (valve one). The solids level in the feed increases as the feed material remains in the machine. Occasionally, a cleaner is added to the membrane stack and continued oscillation helps clean the membrane in minutes. This process can be automated and only consumes approximately 50 gallons (189 liters) of cleaning solution thus reducing cleaner disposal problems inherent with other membrane systems.

Nanofiltration (0.001μ-0.01μ)

Nanofiltration or NF membranes are essentially "loose" reverse osmosis membranes. These semi-permeable membranes are constructed of materials such as sulfonated sulfone, polyamides, and other thin film composites. NF membranes can be used to remove organics and many dissolved materials such as hardness. NF membranes are often used in wastewater treatment to remove BOD. NF can also be used as pretreatment to our spiral RO system; the permeate from a nanofiltration membrane is a "soft" water. The NF membranes of the system operate at pressures from 200 to 600 psi (~14 to ~41 bar) and can withstand a range of pH's from 1 to 14.

Microfiltration (0.1μ-2.0μ)

The microfilters used in the system 10 are almost exclusively PTFE (Teflon®). Microfilters or MF membranes are used to remove small suspended solids, large colloidal material, some emulsions, and most bacteria. MF membranes do not hold back any dissolved solids. MF membranes are especially useful in dewatering slurries such as titanium dioxide and calcium carbonate. Teflon MF membranes are the most robust of all the membrane types; they can withstand temperatures of 130° C. (266° F.) and as they are chemically inert, can handle continuous pH levels of 0-14. MF membrane operating pressures are usually between 30 and 100 psi (~2 to ~7 bar).

A non-limiting list of industries that the system is useable in includes:

Biogas
Chemical Processing
Electronics
Food and Beverage
Beverage Production
Dairy Processing Olive Processing
Manufacturing
Landfill Leachate
Manure Management
Mining
Paints & Pigments
Petroleum Processing
Frac Water
Power Generation
Nuclear Power
Pulp & Paper
Renewable Energy
Wastewater Treatment
RO Reject/Brine Minimization
ZLD
Water A non-limiting list of fluids that the system is useable with includes:

Wastewater
Biogas Effluent
Bilge Water
Boiler Feed Water
Cooling Tower Blowdown
Deicing Fluids
Flue Gas Scrubber Effluent
Groundwater Remediation
Herbicide/Pesticide Wastewater
Metals
AFFF PFOS PFAS
Ion Exchange Regen Water
Laundry Wastewater
Landfill Leachate
Latex Wastewater
Manure
Palm Oil Mill Effluent (POME)
Phenol Wastewater
PTFE Wastewater
Radioactive Wastewater
Rendering Wastewater
RO Reject
Sandfilter Backwash
Slaughterhouse Wastewater
Starch Wastewater
Tannery Effluent
Textile Dye Wastewater
Wool Scouring
Yeast Manufacturing
Chemical Processing
Ammonium Nitrate Concentration
Carbon Black Concentration
Carbon Black Washing
Calcium Carbonate Concentration
Catalyst Diafiltration
Colloidal Silica Concentration
Iron Oxide Concentration
Kaolin Clay Concentration
Metal Hydroxide Filtration
Phosphoric Acid Purification
Pigment Concentration
Polymer Diafiltration
PVA Concentration
PVC Latex Concentration
Sodium Sulfate Concentration
Titanium Dioxide Concentration
Titanium Dioxide Wash Water
Zeolite Washing
Petroleum and Biofuels
Algae Dewatering
Catalyst Recovery
Coal Seam Gas Wastewater
DEA Recovery
Desalter Effluent
Disposal Well Injection Water
Distillery Effluent (Vinasse)
Drilling Fluid Recycling
Ethanol Stillage
Frac Water
Fuel Storage Tank Water
Heavy Coker Gas Oil
LPG Caustic Wash Water
Produced Water
Refinery End of Pipe Wastewater
Selenium Removal
Slop Oil
Stripped Sour Water
Waste Oil Recycling
Water, Food, and Beverage
Beer Bottoms
Beet Juice Clarification
Boiler Feed Water
Bottled Water
Cheese Whey Effluent
Drinking Water
Groundwater/Well Water
Olive Oil Filtration
Olive Processing Wastewater
Orange Juice Clarification
River Water Purification
RO Reject
Sugar Water Clarification
Tea Concentration
Winery Wastewater
Pulp and Paper
Black Liquor
Box Plant Effluent
Hardboard Squeezings
Medium Density Fiberboard
Paper Coating Recycling
Whitewater
Manufacturing
Catalytic Converter Coating Recovery
Oily Wastewater
Coolant Recovery
Metal Plating Wastewater
Silicon Grinder Wastewater
Ultrapure Water
Mining
Acid Mine Drainage
Coal Mine Runoff
Cooling Pond Water
Nickel Mine Sulfate Removal
Phosphate Mine Wastewater
Tailings Pond Water
Coal Ash Ponds For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

Although the invention or elements thereof may by described in terms of vertical, horizontal, transverse (lateral), longitudinal, and the like, it should be understood that variations from the absolute vertical, horizontal, transverse, and longitudinal are also deemed to be within the scope of the invention.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A filtration system, comprising:
   a movable enclosure having a ceiling with a predetermined height, the ceiling having an openable and closeable ceiling passage;
   at least one filter assembly disposed in the enclosure, each of the at least one filter assembly including a filter base and a filter cartridge connectible and dis-connectible to the filter base, the filter cartridge having a height such that when it is disposed on the filter base, the filter cartridge extends beyond the predetermined height of the ceiling of the moveable enclosure;
   a fluid input/output assembly disposed in the enclosure and fluidically connected to the at least one filter assembly, the fluid input/output assembly being for receiving fluid to be cleaned and inputting it to the at least one filter assembly and for receiving filtered fluid from the at least one filter assembly and for outputting it to an environment outside the filtration system; and
   a filter cartridge mover disposed in the enclosure, for connecting and disconnecting the respective filter cartridge to the respective filter base of each of the at least one filter assembly.

2. The filtration system of claim 1, wherein the filter cartridge mover is a crane.

3. The filtration system of claim 1, wherein the moveable enclosure is a trailer.

4. The filtration system of claim 1, wherein the filter cartridge mover is a crane.

5. The filtration system of claim 1, wherein the movable enclosure is a trailer and wherein the filter cartridge mover is a crane.

6. The filtration system of claim 5, wherein at least one further filter cartridge is stored in the enclosure of the trailer for storage or transport, and wherein for each of the at least one filter assembly the crane is adapted to remove the filter cartridge from the filter base and to move a one of the at least one further filter cartridge from the inside of the enclosure to the filter base, through the ceiling passage, whereby each of the at least one further filter cartridge is disposed on top of a respective filter base and extends upwardly through the ceiling passage and outside the trailer for filtering.

7. The filtration system of claim 1, wherein the enclosure has at least one hatch to close the ceiling passage.

8. The filtration system of claim 7, wherein each of the at least one hatch has two, opposing, hatch panels.

9. The filtration system of claim 1, wherein the filter cartridge of each of the at least one filter assembly is a Vibratory Shear Enhanced Processing (VSEP) cartridge.

10. The filtration system of claim 1, wherein for each of the at least one filter assembly the filter base comprises a frame, a vibration drive, and a vibration plate.

11. The filtration system of claim 1, wherein there are at least two filter assemblies and wherein the filter assemblies are configured in an in-line, tandem orientation along a central longitudinal line extending from a front of the enclosure to a rear of the enclosure.

12. The filtration system of claim 11, further comprising two filter cartridge storage locations, the filter cartridge storage locations being disposed between the filter cartridge mover and the filter assemblies.

13. The filtration system of claim 4, wherein the crane has a base, a hoist and winch assembly, and an extendable and retractable boom, and wherein the hoist and winch assembly is rotatable about the crane base.

14. The filtration system of claim 1, further comprising a fluid feed assembly.

15. The filtration system of claim 14, further comprising a cleaning fluid supply assembly fluidically connected to the at least one filter assembly.

16. A portable fluid filtration system, comprising:
   a trailer having a ceiling with a predetermined height, and having an openable and closeable ceiling passage;
   at least one filter assembly disposed in the trailer, each of the at least one filter assembly including a filter base and a filter cartridge connectible and dis-connectible to the filter base, and wherein the filter cartridge has a height such that when it is disposed on the filter base, the filter cartridge extends beyond the predetermined height of the trailer ceiling;
   a fluid input/output assembly disposed in the trailer and fluidically connected to the at least one filter assembly, the fluid input/output assembly being for receiving fluid to be cleaned and inputting it to the at least one filter assembly and for receiving filtered fluid from the at least one filter assembly and for outputting it to an environment outside the filtration system; and
   a rotatable, extendable filter cartridge mover disposed in the trailer, for connecting and disconnecting the respective filter cartridge to the respective filter base of each of the at least one filter assembly.

17. A portable Vibratory Shear Enhanced (VSEP) fluid filtration system, comprising:
   a. a trailer having a ceiling with a predetermined height, and having an openable and closeable ceiling passage;
   b. at least two filter assemblies disposed in the trailer, each filter assembly including a filter base and a filter cartridge connectible and dis-connectible to the filter base, wherein each filter cartridge has a height such that when it is disposed on the filter base, each filter cartridge extends beyond the predetermined height of the trailer ceiling, and wherein each filter base includes a frame, a vibration drive and a vibration plate;
   c. a fluid input/output assembly disposed in the trailer and fluidically connected to the at least two filter assemblies, the fluid input/output assembly being for receiving fluid to be cleaned and inputting it to the at least two filter assemblies and for receiving filtered fluid from the at least two filter assemblies and for outputting it to an environment outside the filtration system; and
   d. a rotatable, extendable crane disposed in the trailer, for connecting and disconnecting the filter cartridges to the filter bases, wherein the crane includes a base, a hoist and winch assembly, and an extendable and retractable boom, and wherein the hoist and winch assembly is rotatable about the base of the crane.

* * * * *